United States Patent [19]

Miyamoto et al.

[11] Patent Number: 5,131,917

[45] Date of Patent: Jul. 21, 1992

[54] FIBER REACTIVE RED DYE COMPOSITION

[75] Inventors: Tetsuya Miyamoto, Nara; Yutaka Kayane, Ikoma; Sadanobu Kikkawa, Minoo; Kingo Akahori, Toyonaka, all of Japan

[73] Assignee: Sumitomo Chemical Company, Limited, Osaka, Japan

[21] Appl. No.: 620,784

[22] Filed: Dec. 3, 1990

[30] Foreign Application Priority Data

Dec. 11, 1989 [JP] Japan .................................. 1-322219
Dec. 25, 1989 [JP] Japan .................................. 1-337696
Feb. 22, 1990 [JP] Japan .................................. 2-43563

[51] Int. Cl.⁵ .................. C09B 67/22; D06P 1/38; D06P 3/18
[52] U.S. Cl. .................................... 8/549; 8/436; 8/437; 8/543; 8/639; 8/641; 8/917; 8/918; 8/919; 8/924; 8/926
[58] Field of Search .................................. 8/549, 641

[56] References Cited

U.S. PATENT DOCUMENTS

| | | | |
|---|---|---|---|
| 3,223,470 | 12/1965 | Boedeker et al. | 8/548 |
| 4,341,699 | 7/1982 | Tezuka et al. | 534/638 |
| 4,448,583 | 5/1984 | Corso | 8/527 |
| 4,693,725 | 9/1987 | Yamauchi et al. | 8/527 |
| 4,780,104 | 10/1988 | Yamauchi et al. | 8/527 |

FOREIGN PATENT DOCUMENTS

| | | |
|---|---|---|
| 0208829 | 1/1987 | European Pat. Off. . |
| 0234573 | 9/1987 | European Pat. Off. . |
| 80/039672 | 10/1980 | Japan . |
| 62-174270 | 7/1987 | Japan . |
| 8403312 | 8/1984 | PCT Int'l Appl. . |

OTHER PUBLICATIONS

*Chemical Abstracts*, (1987) 107:219096x, Yamaguchi et al.

*Primary Examiner*—A. Lionel Clingman
*Attorney, Agent, or Firm*—Stevens, Davis, Miller & Mosher

[57] ABSTRACT

A reactive dye composition comprising a monoazo compound of the following formula (I) in the free acid form,

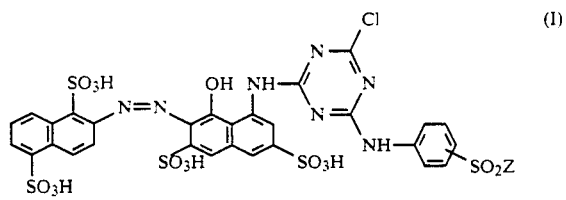

and at least one member selected from monoazo compounds of the following formulas (II) to (IV) in each free acid form,

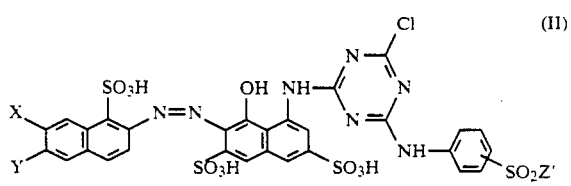

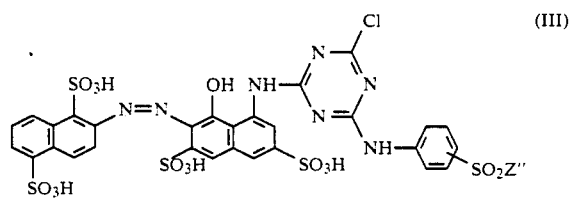

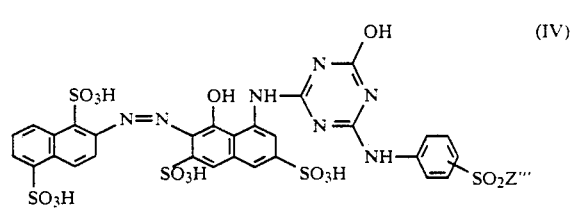

wherein Z, Z' and Z''' are each $-CH=CH_2$ or $-CH_2CH_2Z_1$, $-CH_2CH_2Z_2$ or $-CH_2CH_2Z_3$, respectively, in which $Z_1$, $Z_2$ and $Z_3$ are each a group capable of being split by the action of an alkali, Z'' is $-CH=CH_2$, and any one of X and Y is sulfo, and the other is hydrogen, exhibits superior dye performance such as solubility, storage stability and build-up property, and is useful for dyeing or printing fiber materials such as cellulose fiber in a red color excellent in various fastness properties.

12 Claims, No Drawings

FIBER REACTIVE RED DYE COMPOSITION

The present invention relates to a reactive dye composition useful for dyeing or printing hydroxyl or amide group-containing materials, particularly those such as cellulose fibers, natural or synthetic polyamide fibers, polyurethane fibers, leathers or their mixed fibers, to give dyed or printed products superior in fastness properties such as light fastness and wet fastness.

Many fiber reactive dyes useful for dyeing or printing such materials in a red color are known. Among those, monoazo dyes in which a vinylsulfone type fiber reactive group is attached to a monoazo chromophore through a substituted triazinyl bridging group, particularly those disclosed in U.S. Pat. No. 4,341,699 and Published Examined Japanese Patent Application No. 55-39672 have been extensively used for dyeing or printing such fiber materials, because of their excellent dye characteristics.

However, these prior art red dyes are not yet sufficient for meeting recent needs of high level with respect to dyeability of the dye, applicability thereof to a specific dyeing method and fastness properties of dyed or printed products.

The above-mentioned monoazo dyes are also waiting for improvement in dye performance such as solubility, storage stability, build-up property and fastness properties such as acid-hydrolysis fastness.

Solubility is a significant property of the reactive dye which is necessary for performing the dyeing or printing of fiber materials without difficulty. Moreover, recent dyeing and printing systems in a dye house have been highly mechanized and automated in many aspects to save energy and labor, and therefore reactive dyes in the form of aqueous liquid compositions are badly needed for automatic weighing and dispensing systems. This is another reason why the solubility of the reactive dye is significant.

The build-up property is significant from not only the economical point of view, but recent trends show that deeply colored products have become desirable, and therefore now are strongly desired to be improved.

The present inventors have made extensive studies to find a reactive dye meeting the needs described above and satisfying other requirements that have become in high demand, and as a result attained the present invention.

The present invention provides a reactive dye composition comprising a monoazo compound of the following formula (I) in a free acid form,

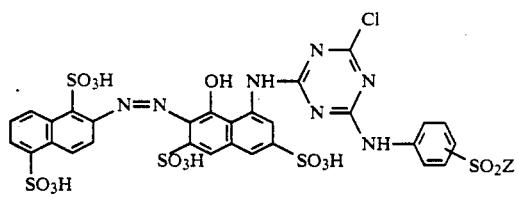

wherein Z is —CH=CH$_2$ or —CH$_2$CH$_2$Z$_1$ in which Z$_1$ is a group capable of being split by the action of an alkali, and at least one member selected from the group consisting of monoazo compounds of the following formulas (II), (III) and (IV) in each free acid form, the formula (II) being

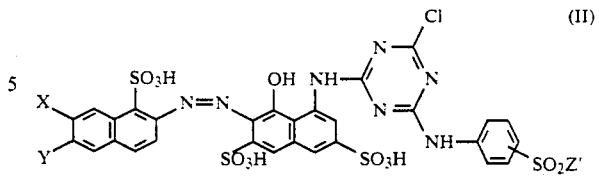

wherein any one of X and Y is sulfo, and the other is hydrogen, and Z' is —CH=CH$_2$ or —CH$_2$CH$_2$Z$_2$ is a group capable of being split by the action of an alkali, the formula (III) being

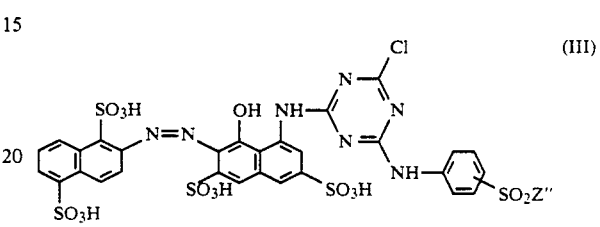

wherein Z" is —CH=CH$_2$, provided that the —SO$_2$Z" is located at o-, m- or p-position against the imino when the —SO$_2$Z in the above formula (I) is located at o-, m- or p-position against the imino, respectively, and the monoazo compound of the above formula (I) is one having —CH$_2$CH$_2$Z$_1$ as Z, and the formula (IV) being

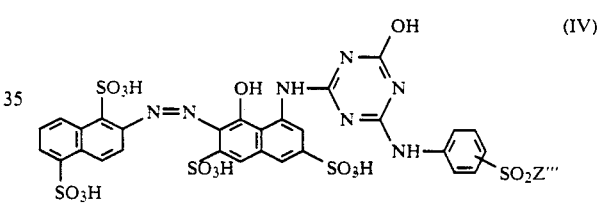

wherein Z''' is —CH=CH$_2$ or —CH$_2$CH$_2$Z$_3$ in which Z$_3$ is a group capable of being split by the action of an alkali. The present invention also provides a method for dyeing or printing hydroxyl or amide group-containing materials, which comprises using the reactive dye composition.

The monoazo compounds of the formulas (I) to (IV) may be in a free acid form, or preferably in the form of an alkali metal or alkaline earth metal salt, such as sodium, potassium or lithium salt.

The monoazo compounds of the formulas (I) and (III) are known as disclosed in U.S. Pat. No. 4,341,699, and can be prepared in a manner disclosed therein.

The monoazo compound of the formula (II) is novel, and can be prepared, for example, by condensing a monoazo intermediate of the following formula (V) in a free acid form,

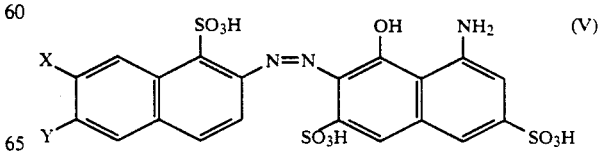

wherein X and Y are as defined above, an amine of the following formula (VI),

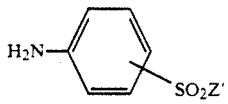

(VI)

wherein Z' is as defined above, and cyanuric chloride in an optional order in a known manner.

The monoazo compound of the formula (IV) is novel, and can be prepared, for example, by subjecting the monoazo compound of the formula (I) to hydrolysis in an aqueous medium in a known manner.

In the present invention, the vinylsulfone type fiber reactive group represented by $-SO_2Z$, $-SO_2Z'$, $-SO_2Z''$ and $-SO_2Z'''$ in the above formulas (I) to (IV), respectively, is located preferably at m- or p-position against the imino group. The group capable of being split by the action of an alkali is well known in the art of reactive dyes, and include, for example, halogen such as chlorine, acetic acid ester group, phosphoric acid ester group, thiosulfuric acid ester and sulfuric acid ester group. Of these, particularly preferred is sulfuric acid ester group.

In order to prepare the reactive dye composition of the present invention, at least one member of the monoazo compounds of the formulas (II) to (IV) can be mixed with the monoazo compound of the formula (I), the amount to be mixed of the one, two or three members being preferably 1 to 60% by weight, more preferably 2 to 40% by weight, based on the weight of the monoazo compound of the formula (I). More specifically, the amount of each monoazo compound of the formulas (II), (III) and (IV) is preferably 1 to 10, more preferably 2 to 5, preferably 1 to 50, more preferably 2 to 25, and preferably 1 to 30, more preferably 2 to 10, respectively.

In the present invention, use of the monoazo compound of the formula (III) is preferred particularly from the viewpoint of build-up property, and the present dye composition comprising the monoazo compound of the formula (III) and that of the formula (II) can exhibit a synergistic effect on the build-up property, and use of the monoazo compound of the formula (IV) is preferred particularly from the viewpoint of solubility in an aqueous medium.

The mixing of the monoazo compounds can be performed in such manner that the preparation method described above is carried out to obtain each monoazo compound simultaneously, in other words, to obtain each monoazo compound in the form of their mixture, or to obtain each monoazo compound independently and then mixed one with the other(s). Alternatively, each monoazo compound may be mixed with each other or one another in the process of dyeing or printing.

The reactive dye composition may be in the form of powder, granule, grain or aqueous liquid and contain conventional dye auxiliary agents such as solubilizing agents, surfactants, buffer substances, dispersing agents and the like.

The reactive dye composition in accordance with the present invention is useful for dyeing or printing hydroxyl or amide group-containing materials by an exhaustion dyeing, padding including cold bath-up, or printing method.

The hydroxyl group-containing materials include natural and synthetic ones such as cellulose fibers, regenerated products thereof and polyvinyl alcohol. Examples of the cellulose fibers are cotton and other vegetable fiber such as linen, hemp, jute and ramie fibers. Examples of the regenerated cellulose fibers are viscose staple and filament viscose.

The amide group-containing materials include natural or synthetic polyamide and polyurethane. Examples of the materials, particularly in the fibrous forms, are wool and other animal furs, silk, leather, polyamide-6,6, polyamide-6, polyamide-11 and polyamide-4.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, as well as a hydrotropic agent, a penetrant, a level dyeing agent and the like.

The padding can be carried out by padding the fiber materials at ambient temperature or elevated temperature, drying them and steaming or dry-heating them to perform the dye-fixation.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a stock paste or emulsifier such as sodium alginate, starch ether and the like may be used, if desired, together with a conventional auxiliary agent such as urea and/or dispersing agent.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminonaphthalene-sulfonic acid, or an addition product between stearylamine and ethylene oxide.

The reactive dye composition in accordance with the present invention is characterized by excellent dye performance in the dyeing and printing of fiber materials, particularly those such as cellulose fibers. For example, the composition can give dyed or printed products of a red color excellent in fastness properties such as light fastness, perspiration-light fastness, wet fastness including washing, peroxide-washing, perspiration, chlorine, acid-hydrolysis and alkaline fastness properties, and abrasion fastness and ironing fastness. The dyed or printed products are hardly subject to change in their color even on a fixing treatment and resin finishing. In addition, the composition is robust so that a shade to be obtained can hardly be affected by changes in dye-bath conditions such as dyeing temperatures and bath ratios, and therefore dyed or printed product with a constant quality can be obtained with superior reproducibility.

Further, the composition of the present invention is characterized by superior solubility and excellent build-up, level-dyeing and washing-off properties. Moreover, the composition is superior in storage stability so that little deterioration occurs even in contact with basic substances during storage.

The present invention is illustrated in more detail with reference to the following Examples, which are only illustrative, but not limitative. In the Examples, all parts and % are by weight, unless otherwise specified.

EXAMPLE 1

100 Parts of a monoazo compound having the following formula (1) in the free acid form,

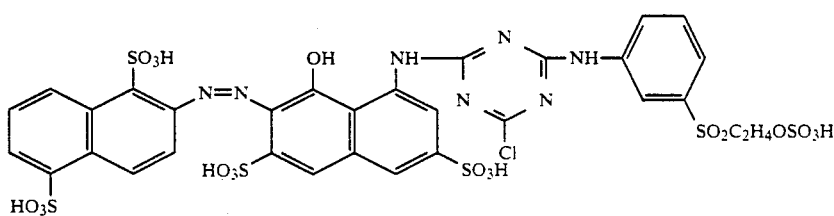

(1)

and 10 parts of a monoazo compound having the following formula (2) in the free acid form,

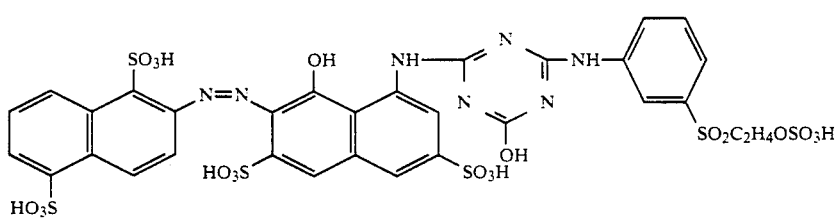

(2)

were mixed with each other to obtain a reactive dye composition.

Each of 0.1, 0.3 and 0.6 parts of the composition was dissolved in 200 parts of water, respectively. 10 Parts of sodium sulfate and 10 parts of cotton were added thereto. The bath was heated to 60° C., and then 4 parts of sodium carbonate was added thereto. Dyeing was continued for 1 hour at that temperature. The cotton taken out was washed with water, soaped, again washed with water, and then dried to obtain each dyed product of a red color excellent in fastness properties.

The monoazo compound of the formula (2) was prepared by heating the monoazo compound of the formula (1) to 60° to 80° C. in an aqueous medium of pH 1 to 3.

EXAMPLE 2

100 Parts of the monoazo compound of the formula (1) and 20 parts of the monoazo compound of the formula (2) were mixed with each other to obtain a reactive dye composition.

Using the composition, dyeing of cotton was carried out in a manner similar to that of Example 1, thereby obtaining each dyed product of a red color excellent in fastness properties.

EXAMPLE 3

100 Parts of the monoazo compound of the formula (1) and 3 parts of the monoazo compound of the formula (2) were mixed with each other to obtain a reactive dye composition.

Using the composition, dyeing of cotton was carried out in a manner similar to that of Example 1, thereby obtaining each dyed product of a red color, excellent in fastness properties.

EXAMPLE 4

100 Parts of a monoazo compound having the following formula (3) in the free acid form,

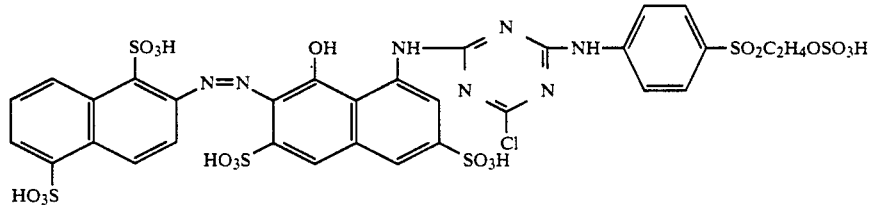

(3)

and 2 parts of a monoazo compound having the following formula (4) in the free acid form,

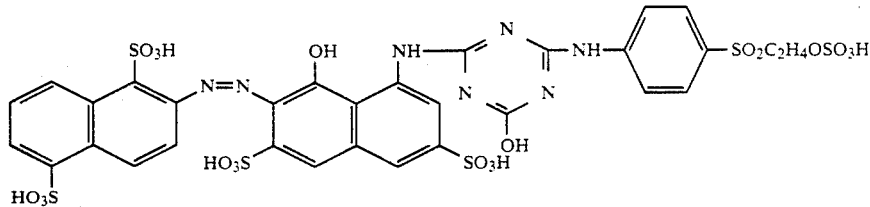

were mixed with each other to obtain a reactive dye composition.

Using the composition, dyeing of cotton was carried out in a manner similar to that of Example 1, thereby obtaining each dyed product of a red color excellent in fastness properties.

EXAMPLE 5

100 Parts of the monoazo compound of the formula (1) and 20 parts of the monoazo compound of the formula (4) were mixed with each other to obtain a reactive dye composition.

Using the composition, dyeing of cotton was carried out in a manner similar to that of Example 1, thereby obtaining each dyed product of a red color excellent in various fastness properties.

EXAMPLE 6

Using the reactive dye composition obtained in Example 1, a color paste having the following composition was prepared.

|  | Parts |
| --- | --- |
| Reactive dye composition | 5 |
| Urea | 5 |
| Sodium alginate (5%) stock paste | 50 |
| Hot water | 25 |
| Sodium hydrogencarbonate | 2 |
| Balance (water) | 13 |

Mercerized broad cotton cloth was printed with the above color paste, and then pre-dried, steamed at 100° C. for 5 minutes, washed with hot water, and thereafter dried to obtain a printed product of a deep red color excellent in various fastness properties.

EXAMPLE 7

100 Parts of the monoazo compound of the formula (1) and 4 parts of a monoazo compound of the following formula (5) in the free acid form,

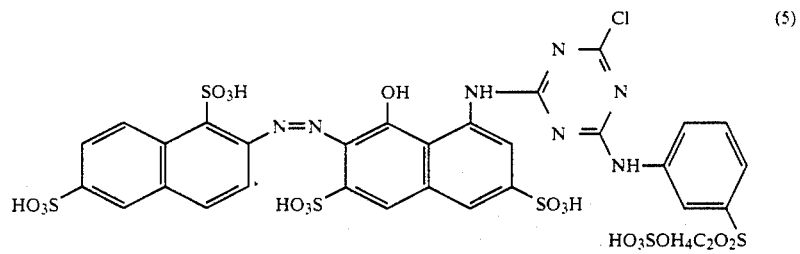

were mixed to obtain a reactive dye composition.

EXAMPLE 8

100 Parts of the monoazo compound (1) and 10 parts of the monoazo compound (5) were mixed with each other to obtain a reactive dye composition.

EXAMPLE 9

100 Parts of the monoazo compound (1) and 3 parts of the monoazo compound (5) were mixed with each other to obtain a reactive dye composition.

EXAMPLE 10

100 Parts of the monoazo compound (1) and 2 parts of a monoazo compound having the following formula (6) in the free acid form, were mixed with each other to obtain a reactive dye composition.

EXAMPLE 11

100 Parts of the monoazo compound (3) and 10 parts of a monoazo compound having the following formula (7) in the free acid form,

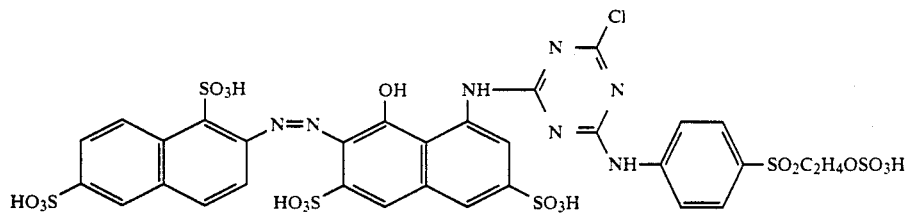

(7)

EXAMPLE 12

Using the reactive dye compositions obtained in Examples 7 to 10, each dyeing of cotton was carried out in a manner similar to that of Example 1, thereby obtaining each dyed product of a red color excellent in various fastness properties.

In addition, in manners similar to those of Example 6, each color paste was prepared using such reactive dye composition, and printing was carried out, respectively, thereby obtaining each printed product of a deep red color excellent in various fastness properties.

EXAMPLE 13

100 Parts of the monoazo compound (1) and 10 parts of a monoazo compound having the following formula (8) in the free acid form,

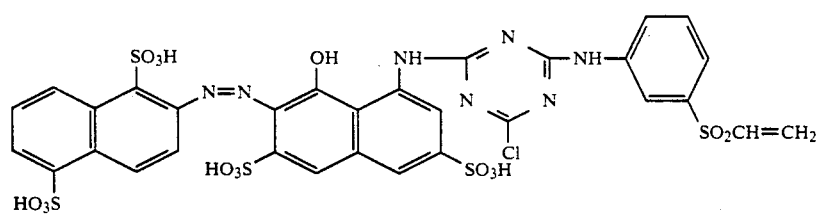

(8)

which have been prepared by treating the monoazo compound (1) in an aqueous medium of pH 7 to 9 at a temperature of 30° to 50° C., were mixed with each other to obtain a reactive dye composition.

EXAMPLE 14

100 Parts of the monoazo compound (1) and 20 parts of the monoazo compound (8) were mixed with each other to obtain a reactive dye composition.

EXAMPLE 15

100 Parts of the monoazo compound (1) and 3 parts of the monoazo compound (8) were mixed with each other to obtain a reactive dye composition.

EXAMPLE 16

100 Parts of the monoazo compound (3) and 5 parts of a monoazo compound having the following formula (9) in the free acid form,

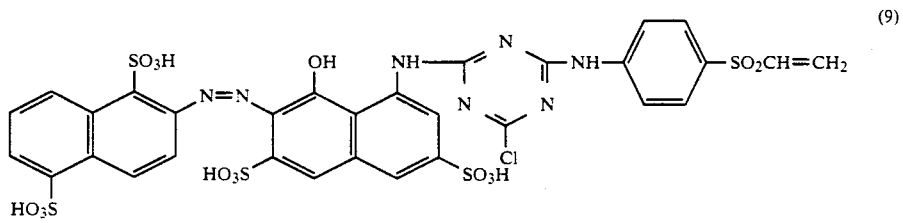

(9)

were mixed with each other to obtain a reactive dye composition.

EXAMPLE 17

100 Parts of the monoazo compound (1) and 20 parts of the monoazo compound (9) were mixed with each other to obtain a reactive dye composition.

EXAMPLE 18

Using the reactive dye compositions obtained in Examples 13 to 17, each dyeing of cotton was carried out in a manner similar to that of Example 1, thereby obtaining each dyed product of a red color excellent in various fastness properties. In these exhaustion dyeings, every reactive dye composition was found to have superior build-up property.

Further, using the composition obtained in Example 13, Example 6 was repeated to obtain a printed product of a deep red color excellent in various fastness properties.

EXAMPLE 19

The monoazo compounds of the formulas (1), (2) and (8) each in an amount of 100, 5 and 10 parts, respectively, were mixed with one another to obtain a reactive dye composition.

EXAMPLE 20

The monoazo compounds of the formulas (1), (2) and (8) each in an amount of 100, 3 and 20 parts, respectively, were mixed with one another to obtain a reactive dye composition.

EXAMPLE 21

The monoazo compounds of the formulas (1), (2) and (5) each in an amount of 100, 10 and 4 parts, respectively, were mixed with one another to obtain a reactive dye composition.

EXAMPLE 22

The monoazo compounds of the formulas (1), (8) and (5) in each amount of 100, 15 and 5 parts, respectively, were mixed with one another to obtain a reactive dye composition.

EXAMPLE 23

The monoazo compounds of the formulas (3), (4) and (9) each in an amount of 100, 1 and 5 parts, respectively, were mixed with one another to obtain a reactive dye composition.

EXAMPLE 24

The monoazo compounds of the formulas (3) and (9) and a monoazo compound having the following formula (10) in the free acid form,

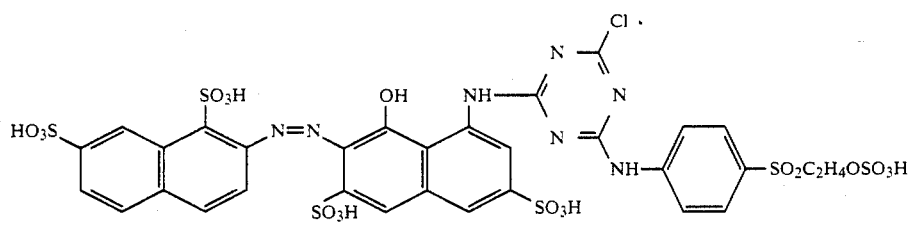

each in an amount of 100, 15 and 3 parts, respectively, were mixed with one another to obtain a reactive dye composition.

EXAMPLE 25

The monoazo compounds of the formulas (1), (2), (5) and (8) each in an amount of 100, 5, 4 and 10 parts respectively, were mixed with one another to obtain a reactive dye composition.

EXAMPLE 26

The monoazo compounds of the formulas (1), (2), (6) and (8) each in an amount of 100, 5, 2 and 10 parts, respectively, were mixed with one another to obtain a reactive dye composition.

EXAMPLE 27

The monoazo compounds of the formulas (3), (4), (7) and (9) each in an amount of 100, 2, 4 and 15 parts, respectively, were mixed with one another to obtain a reactive dye composition.

EXAMPLE 28

Using the reactive dye compositions obtained in Examples 19 to 27, each dyeing of cotton was carried out in a manner similar to that of Example 1, thereby obtaining each dyed product of a red color excellent in various fastness properties. In these exhaustion dyeings, every dye composition was found to have superior build-up property.

We claim:

1. A reactive dye composition comprising a monoazo compound of the following formula (I) in a free acid form,

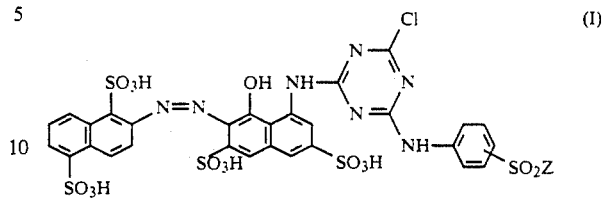

wherein Z is $-CH=CH_2$ or $-CH_2CH_2Z_1$ in which $Z_1$ is a group capable of being split by the action of an alkali, and at least one member selected from the group consisting of monoazo compounds of the following formulas (II), (III) and (IV) each in free acid form, the formula (II) being

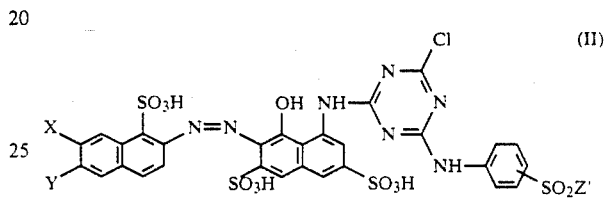

wherein any one of X and Y is sulfo, and the other is hydrogen, and Z' is $-CH=CH_2$ or $-CH_2CH_2Z_2$ in which $Z_2$ is a group capable of being split by the action of an alkali, the formula (III) being

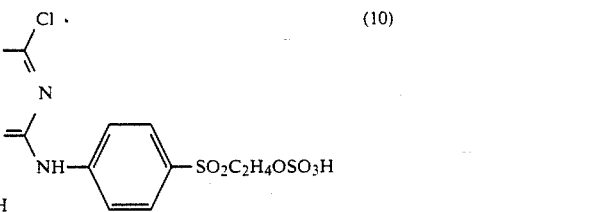

wherein Z'' is $-CH=CH_2$ provided that the $-SO_2Z''$ is located at ortho, meta- or para-position against the imino when the $-SO_2Z$ in the above formula (I) is located at ortho, meta-or para-position against the imino, respectively, and the monoazo compound of the above formula (I) is one having $-CH_2CH_2Z_1$ as Z, and the formula (IV) being

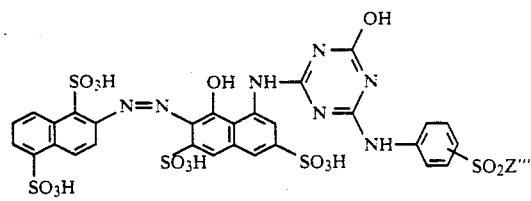

wherein $Z'''$ is $-CH=CH_2$ or $-CH_2CH_2Z_3$ in which $Z_3$ is a group capable of being split by the action of an alkali.

2. The composition according to claim 1, wherein the monoazo compound of the formula (I) is one represented by the following formula in the free acid form,

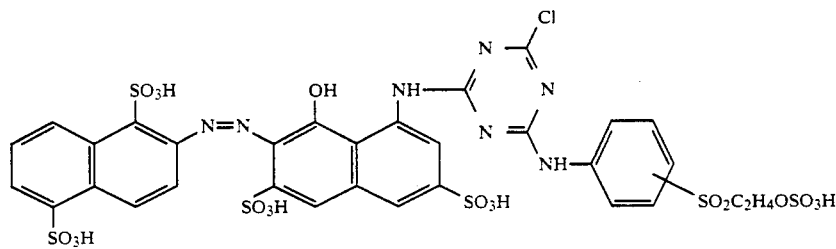

wherein $-SO_2C_2H_4OSO_3H$ is located at meta- or para-position against the imino.

3. The composition according to claim 1, wherein the monoazo compound of the formula (II) is one having $-SO_2Z'$ at meta- or para-position against the imino.

4. The composition according to claim 1, wherein the monoazo compound of the formula (III) is one having $-SO_2Z''$ at meta- or para-position against the imino.

5. The composition according to claim 1, wherein the monoazo compound of the formula (IV) is one having $-SO_2Z'''$ at meta- or para-position against the imino.

6. The composition according to claim 1, wherein the amount of one, two or three members of the monoazo compounds of the formulas (II), (III) and (IV) is 1 to 60% by weight based on the weight of the monoazo compound of the formula (I).

7. The composition according to claim 6, wherein the amount is 2 to 40% by weight based thereon.

8. The composition according to claim 1, which comprises the monoazo compound of the formula (I) and the monoazo compound of the formula (III).

9. The composition according to claim 1, which comprises the monoazo compound of the formula (I), the monoazo compound of the formula (II) and the monoazo compound of the formula (III).

10. The composition according to claim 1, which comprises the monoazo compound of the formula (I), the monoazo compound of the formula (II), the monoazo compound of the formula (III) and the monoazo compound of the formula (IV).

11. A method for dyeing or printing hydroxyl or amide group-containing materials, which comprises using the reactive dye composition of claim 1.

12. Hydroxyl or amide group-containing materials dyed or printed by the method of claim 11.

* * * * *